(12) United States Patent
Serrarens et al.

(10) Patent No.: US 8,882,625 B2
(45) Date of Patent: Nov. 11, 2014

(54) TRANSMISSION MODULE FOR A LORRY (75) Inventors: Alexander Franciscus Anita Serrarens, Waalre (NL); Roell Marie Van Druten, Eindhoven (NL); Bas Gerard Vroemen, Eindhoven (NL)

(73) Assignee: DTI Group, B.V., Eindhoven (NL)

( * ) Notice: Subject to any disclaimer, the term of this patent is extended or adjusted under 35 U.S.C. 154(b) by 341 days.

(21) Appl. No.: 13/380,488

(22) PCT Filed: Jun. 22, 2010

(86) PCT No.: PCT/NL2010/000101
§ 371 (c)(1),
(2), (4) Date: Feb. 24, 2012

(87) PCT Pub. No.: WO2010/151113
PCT Pub. Date: Dec. 29, 2010

(65) Prior Publication Data
US 2012/0142482 A1   Jun. 7, 2012

(30) Foreign Application Priority Data

| Jun. 22, 2009 | (NL) | 2003064 |
| Jan. 14, 2010 | (NL) | 2004096 |
| Jan. 26, 2010 | (NL) | 2004151 |
| Mar. 12, 2010 | (NL) | 2004387 |

(51) Int. Cl.
*F16H 37/02* (2006.01)

(52) U.S. Cl.
USPC ........................................... 475/210

(58) Field of Classification Search
USPC .......................................... 475/210, 314, 326
See application file for complete search history.

(56) References Cited

U.S. PATENT DOCUMENTS

| 7,204,781 B2 * | 4/2007 | Hiraku et al. ................. 475/312 |
| 2004/0127320 A1 * | 7/2004 | Inoue et al. ................... 475/210 |
| 2010/0323839 A1 * | 12/2010 | Kawai ............................ 475/210 |

FOREIGN PATENT DOCUMENTS

| EP | 0 314 644 | 5/1989 |
| WO | WO 2007/011212 | 1/2007 |
| WO | WO 2007/043875 | 4/2007 |
| WO | WO 2010/101467 | 9/2010 |

* cited by examiner

*Primary Examiner* — Sherry Estremsky
(74) *Attorney, Agent, or Firm* — Eric Karich (57) ABSTRACT

A lorry 1 comprises a combustion engine 3 which is connected via the transmission module 5 to the input shaft 7 of an automatic transmission 9 with switchable gear settings. The output shaft 11 of the transmission 9 is connected to the wheels 15 of the lorry via a differential 13. The transmission module 5 comprises a clutch 17 which has two clutch parts 17A and 17B that can be coupled to each other. The transmission module 5 further comprises a part module 19 which has an input 21 and an output 23. The part module 19 comprises a bypass transmission 25 with three rotational members 27, 29, 31 of which the third rotational member 31 can be coupled to the firm world 35 via a brake 33.

16 Claims, 12 Drawing Sheets

TRANSMISSION MODULE FOR A LORRY

FIELD OF THE INVENTION

The invention relates to a transmission module for a vehicle, more particularly a lorry, comprising a clutch that includes two clutch parts which can be mutually coupled, a first clutch part of which being capable of coupling to a drive source of a vehicle and the second clutch part of which being capable of coupling to an input shaft of a transmission of the vehicle.

STATE OF THE ART

A transmission module of this type for a lorry is generally known. This transmission module, when applied to a lorry, is positioned between a drive source and a transmission of the lorry. The transmission comprises at least one switchable transmission formed by two mutually cooperating gears and clutch means.

SUMMARY OF THE INVENTION

It is an object of the invention to improve the known transmission module. For this purpose the transmission module according to the invention is characterised in that the transmission module furthermore comprises a part module which has an input and an output, which part module comprises a transmission as well as a further clutch or brake connected to the transmission, the input of the part module being coupled to the first clutch part and/or being capable of coupling to the drive source of the vehicle, and the output of the part module being coupled to the second clutch part and/or being capable of coupling to the input shaft of the transmission of the vehicle, and the transmission being arranged such that the directions of rotation of the input and output shafts of the part module are equal to each other.

With the transmission module according to the invention it is possible by operating the clutch and further clutch to switch between a gear ratio of one to one and the gear ratio of the transmission of the part module without interruption of the torque transfer. As a result, with the transmission module according to the invention when used in a lorry, it is possible to create twice as many gear ratios as without this transmission module.

Advantages of the transmission according to the invention over the known transmission are the following:

The module allows for shifting with torque transfer from the highest gear to a lower gear. This is particularly important when in the highest gear (prise direct) one has to shift down because a slight slope is to be taken that requires more power.

The module also allows for an extra gear to be created under the lowest gear. This extra low gear allows for changing the end reduction to the wheels such that it is possible to drive with lower r.p.m., which reduces fuel consumption.

Proper and long heat dissipation is possible during creepage in the first gear (with slipping brake) as a result of active cooling possibilities of the brake. This allows for a lower creepage rate.

Power shifts are possible between the 1-2, 3-4 and 5-6 gear shifts.

The main clutch is only used for power shifts and no longer for launching of the vehicle. As a result, it may have a lighter construction and wear will diminish considerably. Possibility for designing a clutch plate for the complete lifespan of the vehicle.

By operating the clutch, the further clutch or brake can be unloaded or synchronised so that it can be opened or closed more easily.

In order to keep the part module cost effective, the further clutch or brake is designed such that it cannot dissipate any significant power in relation to the clutch. The further clutch is preferably arranged as a claw clutch or synchromesh or as a friction clutch or friction brake which cannot dissipate any significant power in relation to the clutch.

The transmission preferably comprises at least one switchable transmission which includes gear wheels as well as clutch means, such as a claw clutch or a synchromesh, for coupling at least one of the gear wheels to a shaft it is located on.

The transmission preferably comprises a continuously variable transmission element such as a push belt or a chain variator.

The clutch is preferably arranged such that if it is not operated, it is closed (normally closed). Furthermore, the further clutch or brake is arranged such that if it is not operated, it is open (normally open).

The clutch is preferably operated by a pull actuator which pulls at a diaphragm spring of the clutch to open the clutch, or by a push actuator which pushes a diaphragm spring of the clutch to open the clutch.

The clutch is preferably arranged as a dry plate friction clutch and the further clutch or brake is arranged as a dry plate friction clutch, or the clutch is arranged as a wet plate friction clutch and the further clutch or brake is arranged as a wet plate friction clutch.

An embodiment of the transmission module according to the invention is characterised in that the transmission is formed by a bypass transmission with at least three rotational members of which a first rotational member is connected to the input, a second rotational member is connected to the output and the third rotational member can be coupled to the firm object via the further clutch or brake. The firm object is for example a transmission housing.

The first rotational member is preferably formed by a ring gear, the second rotational member is formed by a planet gear carrier on which planet gears are bearing mounted and the third rotational member is formed by a sun gear, or the first rotational member by a sun gear, the second rotational member by a second sun gear and the third rotational member by a carrier on which planet gears are bearing mounted.

Preferably a torsion damper is positioned between the first rotational member and a clutch cover forming part of the first clutch part.

Furthermore, preferably an intermediate housing part is positioned between the clutch and a transmission housing of the transmission.

Preferably a rotation seal is present between the first rotational member and the intermediate housing part. Furthermore, preferably a rotation seal is present between the first rotational member and a primary shaft of the transmission.

The connection between the clutch cover and the first rotational member preferably passes underneath the clutch actuator through a connecting sleeve.

Furthermore, preferably the first and the third rotational members are bearing-mounted directly on the primary shaft of the transmission.

Another embodiment of the transmission module according to the invention which forms an alternative to the embodiments described above in which the transmission is formed by a bypass transmission is characterised in that the transmission comprises two partial transmissions each having an input and an output shaft, of which the input shaft of a first one of the partial transmissions is connected to the input and the output shaft of the second one of the partial transmissions is connected to the output and the output shaft of the first partial transmission and the input shaft of the second partial transmission can be coupled to each other by means of the further clutch. The partial transmissions may be for example gear trains, chain transmissions or belt transmissions.

A further embodiment of the transmission module according to the invention is characterised in that the first partial transmission is accelerating and the second partial transmission is retarding in the direction of the output. As a result, the torque that is transferred by the further clutch during operation is reduced, so that the further clutch is loaded to a lesser extent.

A still further embodiment of the transmission module according to the invention is characterised in that the gear ratio of the part module, defined by the r.p.m. during operation of the input divided by the r.p.m. of the output, is greater than 1. Preferably the gear ratio of the part module is greater than or equal to 1.3.

The part module may be arranged as a separate module which can be built-in in the existing drive train of a lorry. For this purpose, the input and the output of the part module are preferably provided with teeth for coupling to the first clutch part and/or drive source or the input shaft of the transmission of the lorry and/or the second clutch part respectively. The teeth may be for example splines. The output is then preferably formed by an extension shaft which is connected to the second clutch part. This extension shaft is used for extending the input shaft of the transmission of the lorry when the transmission module is used in the lorry, so that this input shaft can be connected to the second clutch part.

Preferably, operating means for operating the clutch and/or further operating means for operating the further clutch form part of the part module. The operating means and the further operating mean are preferably fed with compressed air. This air supply is preferably led via the intermediate housing part to the operating means and the further operating means.

The invention also relates to a part module which can be applied to the transmission module according to the invention.

By operating (actuating) the clutch, the further clutch or brake may be unloaded or synchronised so that it can be opened or closed in a simple manner.

By operating (actuating) the clutch and further clutch or brake it is possible to switch gears without torque interruption between 1:1 and a transmission between the drive shaft and the input shaft of the transmission.

By operating (actuating) the further clutch or brake the vehicle may be started out in forward or backward direction.

By operating (actuating) the further clutch or brake the vehicle may be launched in forward or backward direction and by then operating (actuating) the clutch it is possible to shift to a higher gear without torque interruption of the wheels of the vehicle.

BRIEF DESCRIPTION OF THE DRAWINGS

The invention will be described below in more detail based on examples of embodiment of the transmission module according to the invention represented in the drawing figures, in which.

DETAILED DESCRIPTION OF THE DRAWINGS

Figure 1:
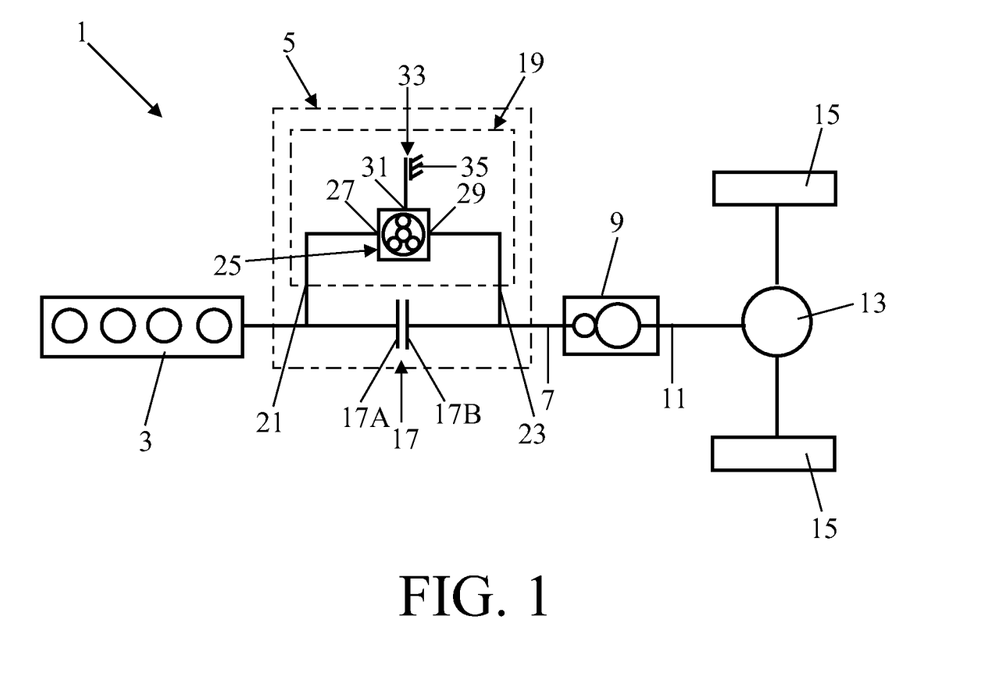
FIG. 1 gives a diagrammatic representation of a first embodiment of the transmission module according to the invention used in a lorry.

FIG. 1 gives a diagrammatic representation of a first embodiment of the transmission module according to the invention used in a lorry. The lorry 1 has a combustion engine 3 which is connected via the transmission module 5 to the input shaft 7 of a for example automatic transmission 9 with switchable drives. The output shaft 11 of the transmission 9 is connected to the wheels 15 of the lorry by means of a differential 13.

The transmission module 5 comprises a clutch 17 having two clutch parts 17A and 17B that can be coupled to each other. The transmission module 5 further comprises a part module 19 which has an input 21 and an output 23. The input 21 is coupled to the clutch part 17A and the output 23 is coupled to the clutch part 17B.

The part module 19 has a bypass transmission 25 with three rotational members of which a first rotational member 27 is connected to the input 21, a second rotational member 29 is connected to the output 23 and the third rotational member 31 can be coupled via a brake 33 to the firm object 35 which is formed for example by the housing of the transmission. The bypass transmission 25 is made such that the directions of rotation of the first and second rotational members 27 and 29 are equal to each other. The brake 33 cannot dissipate significant power in relation to the clutch 17.

Figure 2:
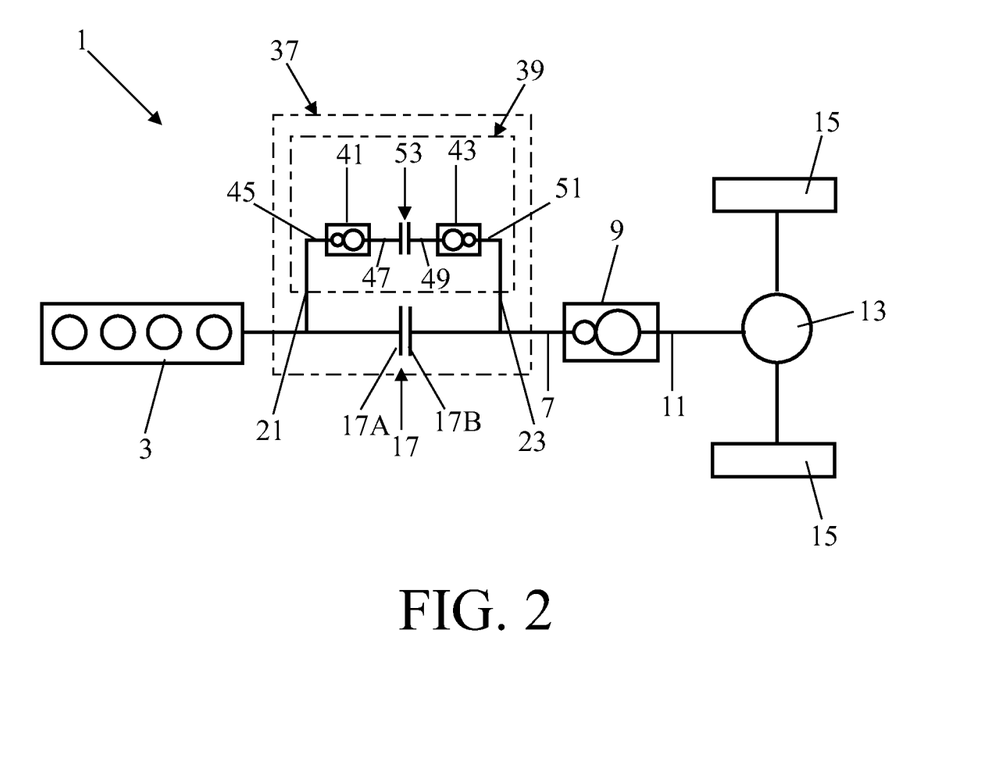
FIG. 2 gives a diagrammatic representation of a second embodiment of the transmission module according to the invention used in a lorry.

FIG. 2 gives a diagrammatic representation of a second embodiment of the transmission module according to the invention used in a lorry. All parts that are equal to those of the first embodiment are referred to by like reference numerals.

The part module 39 of this transmission module 37 has two partial transmissions 41 and 43 each having an input shaft 45, 49 and an output shaft 47, 51. The partial transmissions are formed by gear pairs. The input shaft 45 is connected to the input 21 and the output shaft 51 is connected to the output 23. The output shaft 47 and the input shaft 49 can be coupled to each other by means of a further clutch 53. The further clutch 53 cannot dissipate significant power in relation to the clutch 17 and is arranged as a claw clutch or synchromesh or as a friction clutch or friction brake which cannot dissipate significant power in relation to the clutch. The partial transmission 41 has an accelerating effect and the partial transmission 43 has a retarding effect in the direction of the output 23.

The gear ratio of the transmission modules 5 and 37, defined by the r.p.m. during operation of the input 21 divided by the r.p.m. of the output 23, is approximately 1.3.

Figure 3:
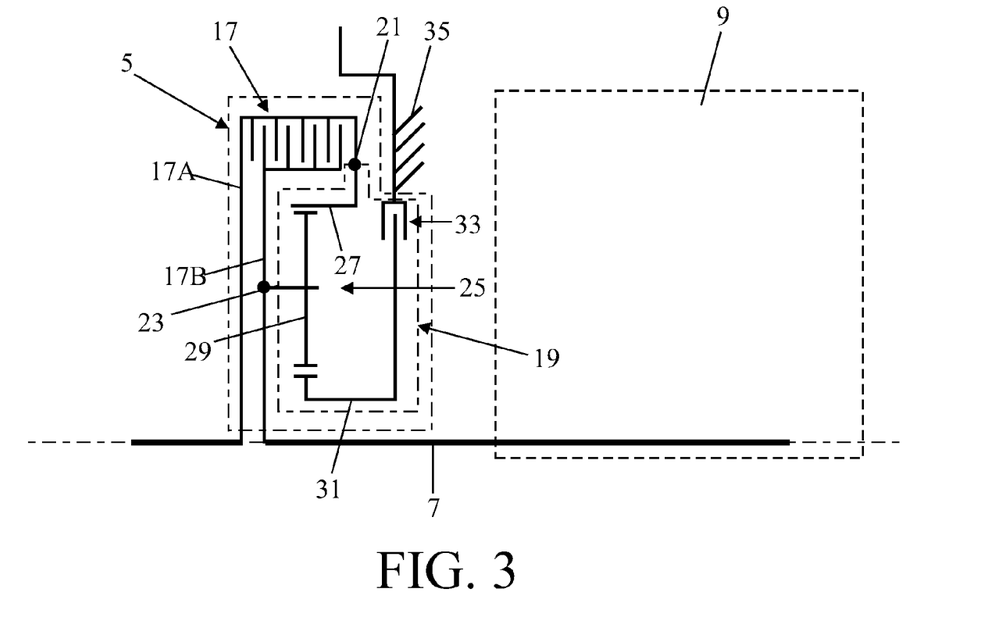
FIG. 3 gives a diagrammatic representation of a constructive embodiment of the transmission module represented in FIG. 1 provided with a wet plate clutch.

FIG. 3 gives a diagrammatic representation of a constructive embodiment of the transmission module represented in FIG. 1. The clutch 17 provided in this embodiment is a wet plate clutch.

Figure 4:
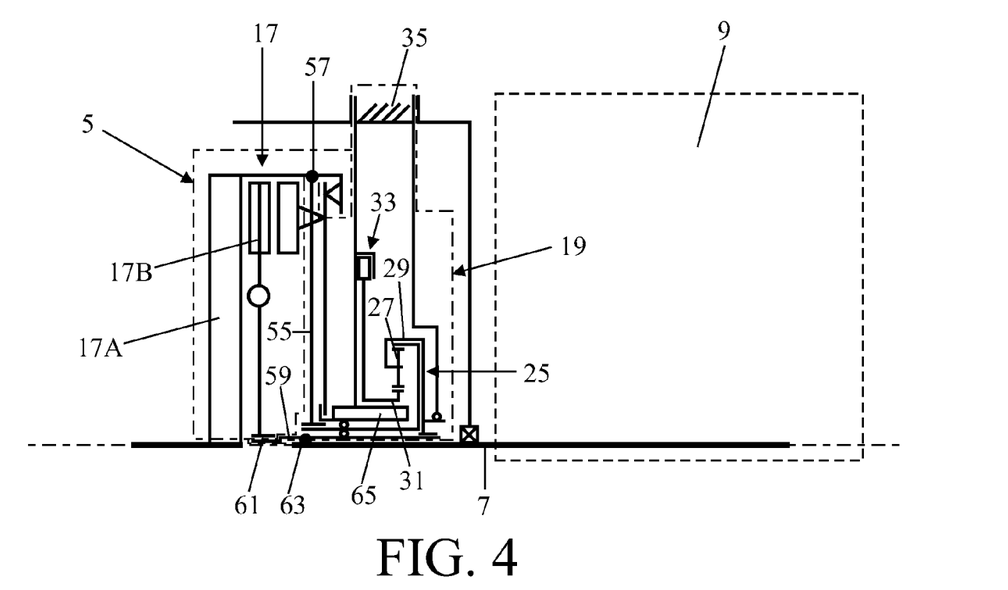
FIG. 4 gives a diagrammatic representation of the transmission module represented in FIG. 1 provided with a dry plate clutch.

FIG. 4 gives a diagrammatic representation of another constructive embodiment of the transmission module represented in FIG. 1. Herein the clutch 17 is provided as a dry plate clutch. The input is constituted by a connecting plate 55 which is coupled to the clutch part 17A formed by a clutch cover via spline teeth 57 or other mechanical connection. The output is formed by an extension shaft 59 which is connected to the second clutch part 17B which is formed by a clutch plate also via spline connection 61 or other mechanical connection, and is connected to the input shaft 7 of the transmission 9 via spline connection 63.

The part module 19 comprises operating means for operating the clutch 17. These operating means are formed by an actuator 65. Further operating means too (not shown) for operating the brake form part of the part module 19.

Figure 5:
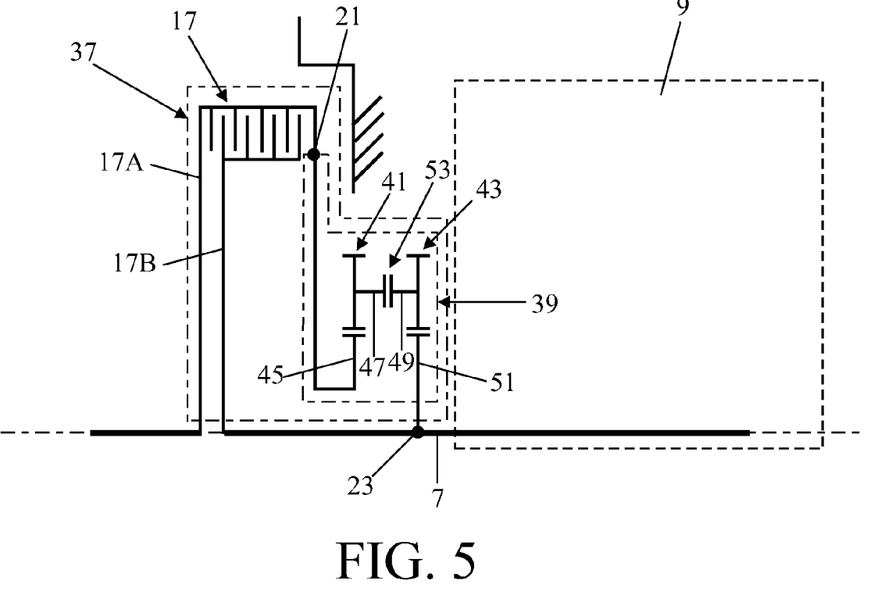
FIG. 5 gives a diagrammatic representation of a constructive embodiment of the transmission module represented in FIG. 2 provided with a wet plate clutch.

FIG. 5 gives a diagrammatic representation of a constructive embodiment of the transmission module represented in FIG. 2. The clutch 17 is again arranged as a wet plate clutch.

Figure 6:
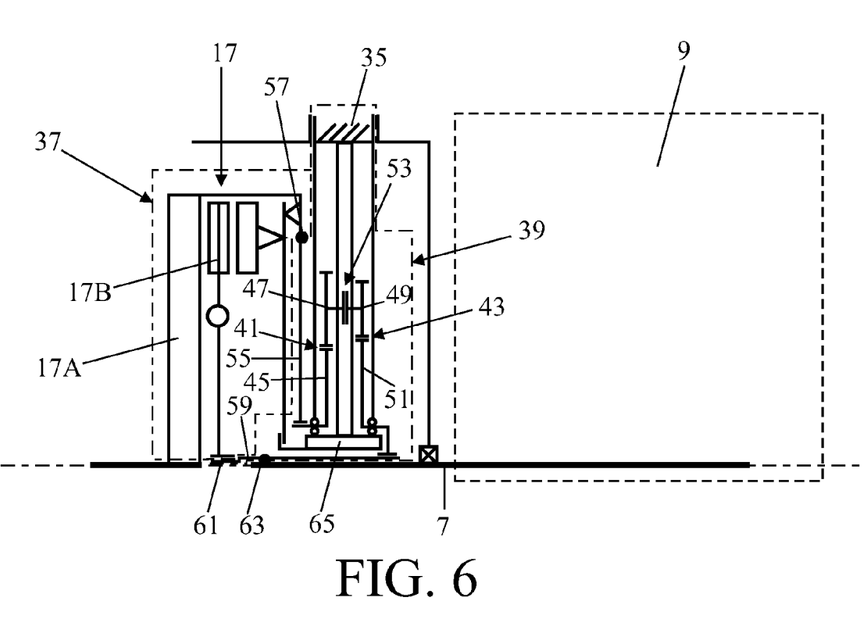
FIG. 6 gives a diagrammatic representation of a constructive embodiment of the transmission module represented in FIG. 2 provided with a dry plate clutch.
Figure 7:
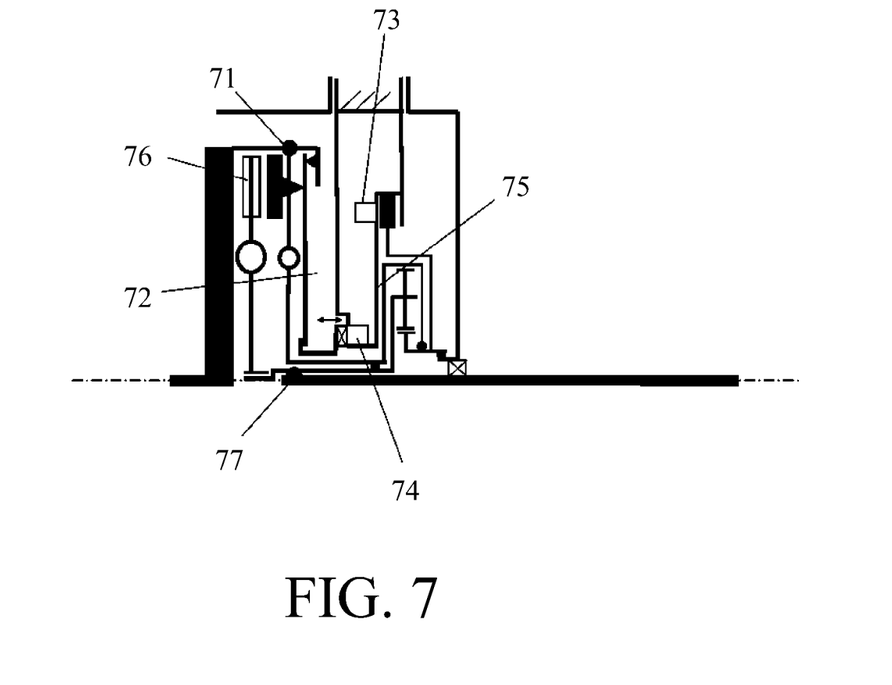
FIGS. 7 to 23 give representations of further embodiments.

FIG. 6 gives a diagrammatic representation of another constructive embodiment of the transmission module represented in FIG. 2. All parts that are equal to those of the first embodiment represented in FIG. 4 are referred to by like reference numerals. The clutch 17 is here arranged as a dry plate clutch. The further operating means (but now for the further clutch) which form part of the part module are not represented here either.

Figure 8:
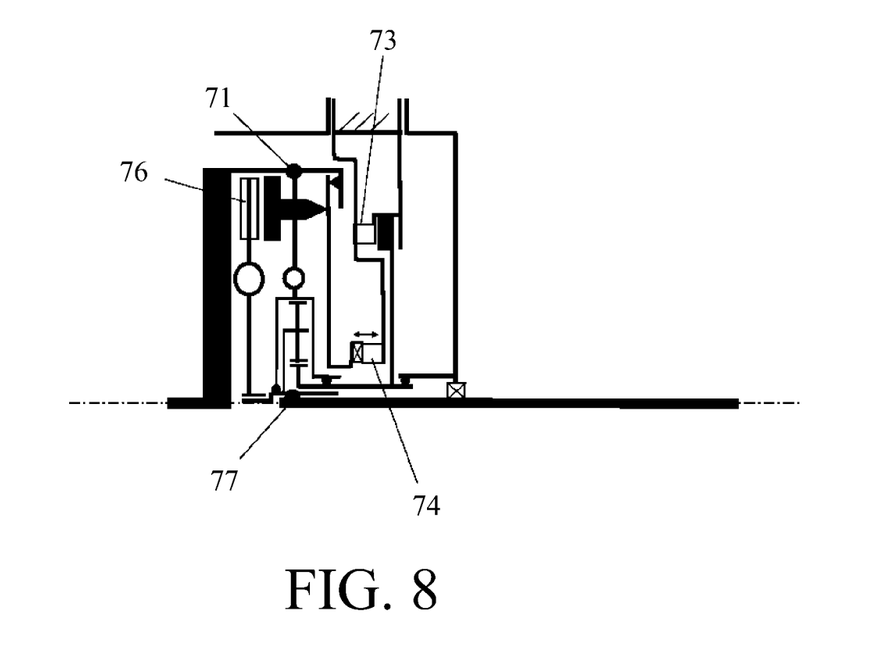

FIGS. 7 to 10 give representations of embodiments with a dry plate clutch and a dry plate brake. The embodiment represented in FIG. 7 comprises a specific connection to the bypass transmission and a specific configuration of the seals (pellets). 71 is used to refer to the connection of the connecting plate 72 to torsion spring and the clutch cover. The brake actuator and clutch actuator are referred to by 73 and 74 respectively, the bypass transmission by 75 and the clutch plate by 76. The input shaft is connected to the clutch plate via a spline connection 77. In FIG. 8 the bypass transmission is positioned inside the clutch housing.

Figure 9:
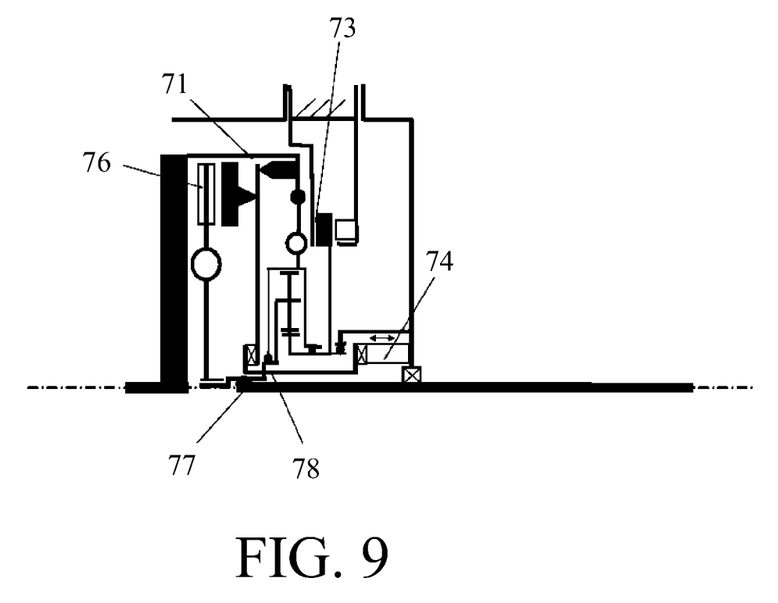
Figure 10:
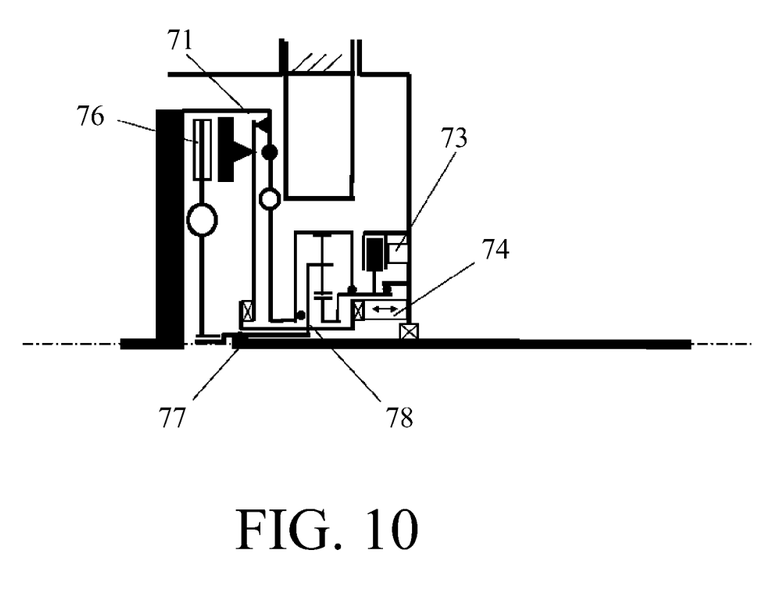

FIGS. 9 and 10 give representations of embodiments in which the clutch actuator is displaced so that it can be actuated direct from the transmission housing. This requires two axial bearings and a through coupling. The through coupling is arranged as a tooth/spline/keyed connection which projects through the connecting plate between the primary shaft and the bypass transmission. The through coupling 78 rotates at the same speed as the connecting plate but is slidable indeed in axial direction with respect to this connecting plate.

Figure 11:
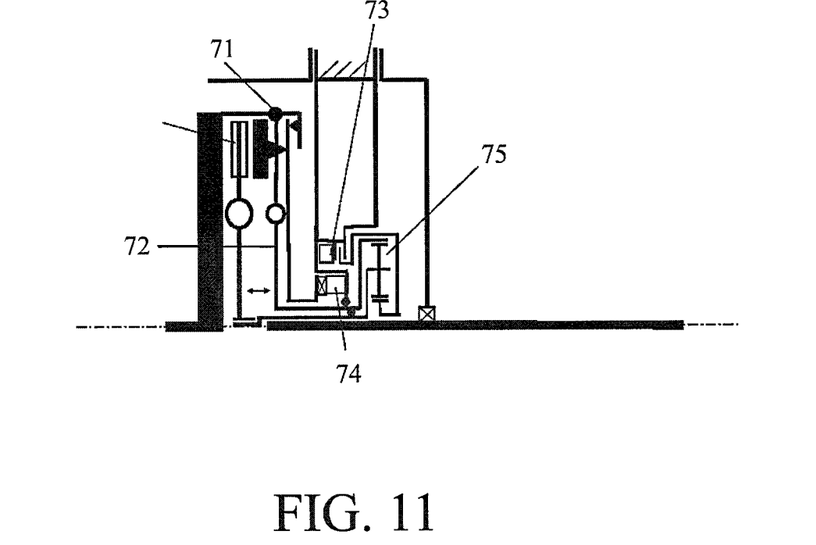
Figure 12:
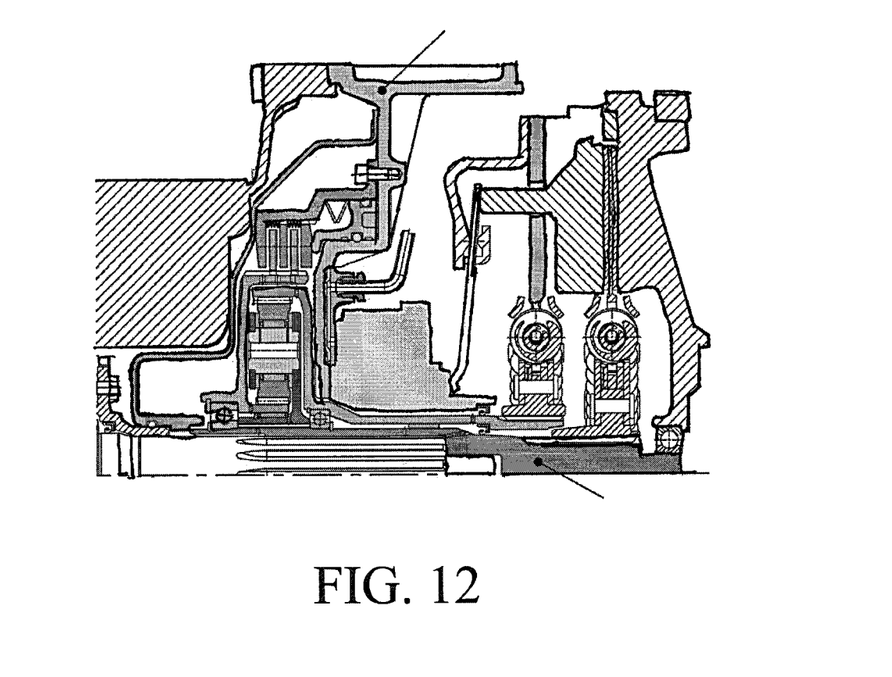
Figure 13:
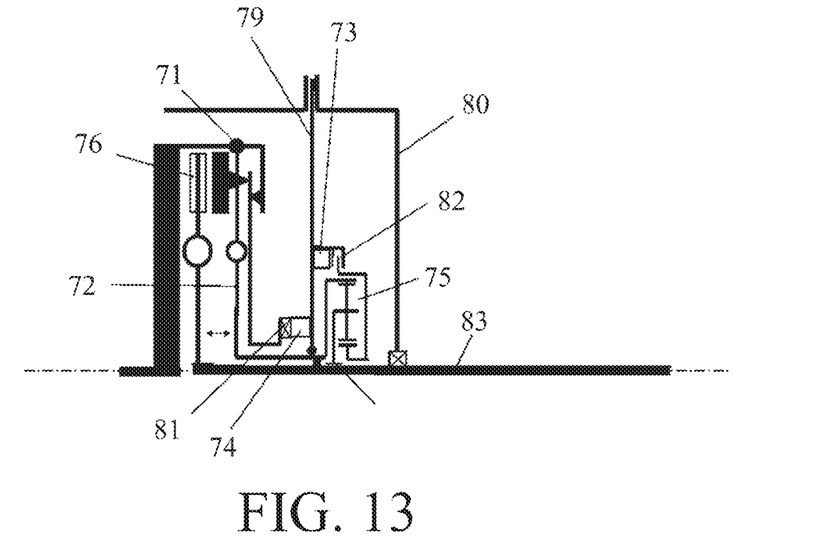
Figure 14:
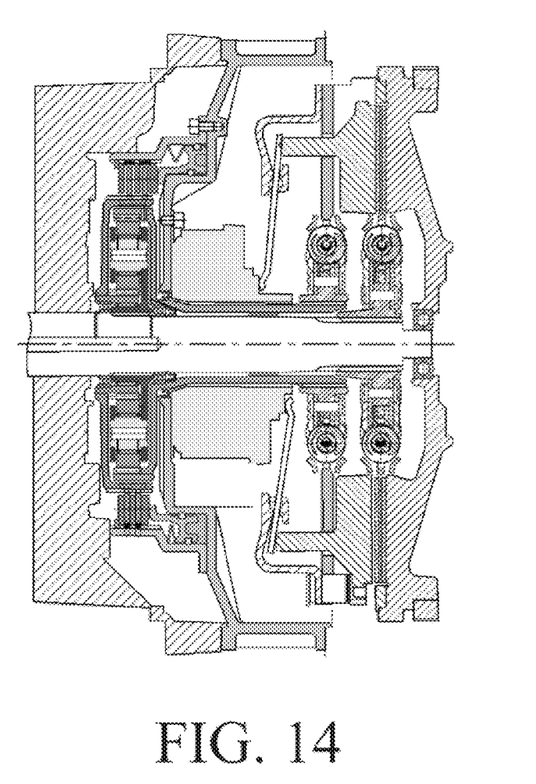
Figure 15:
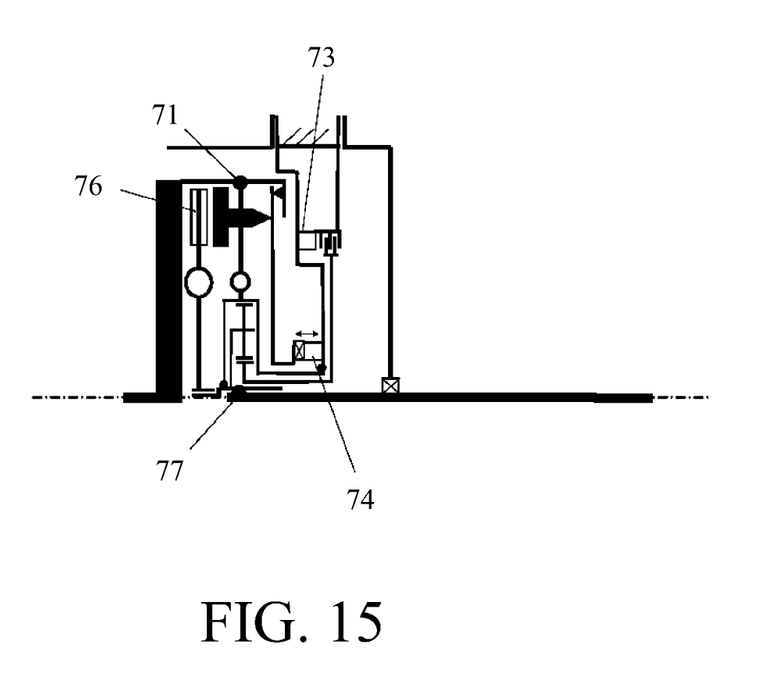

FIGS. 11 to 18 give representations of embodiments with a dry plate clutch and wet plate brake 82. FIG. 12 is a concrete design of the embodiment diagrammatically represented in FIG. 11 and FIG. 14 is a concrete design of the embodiment diagrammatically represented in FIG. 13. Herein the intermediate member is referred to as 79 and the transmission housing as 80. Between the clutch actuator 74 and the lever of the first clutch part is positioned a thrust bearing 81. The primary shaft 83 of the transmission is extended here, but made of one piece (without separate shaft extension). FIG. 15 represents a further variant.

Figure 16:
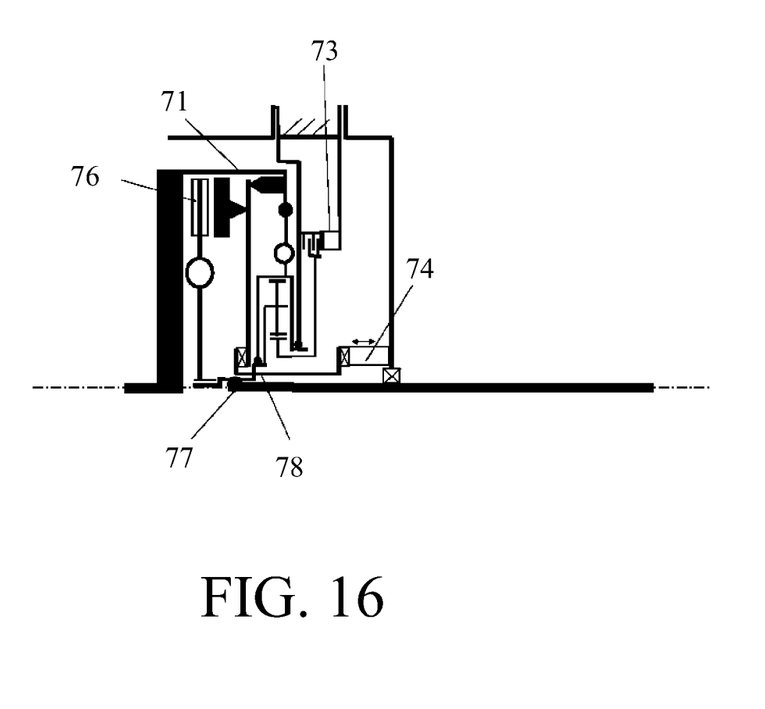
Figure 17:
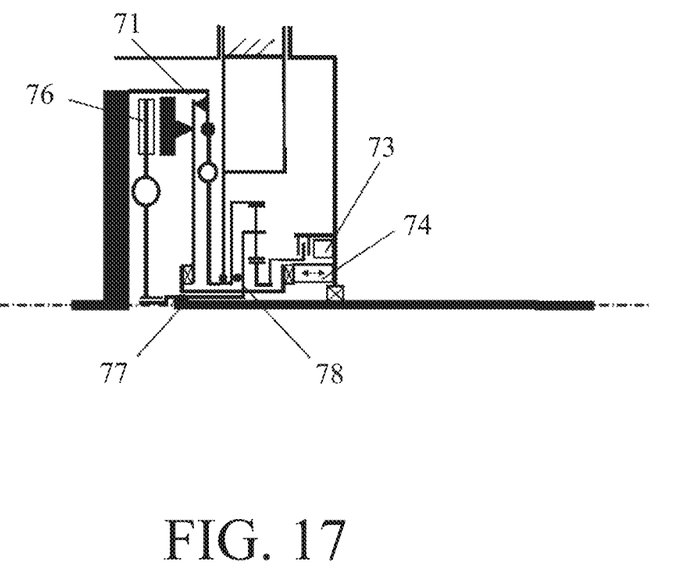
Figure 18:
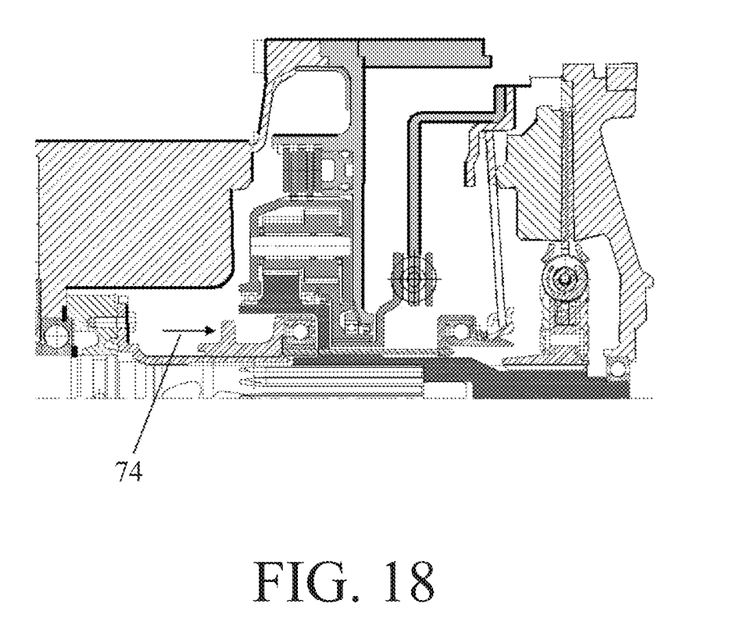

In the embodiments represented in FIGS. 16 and 17 the clutch actuator 74 is displaced so that it can be actuated direct from the transmission housing. This requires two axial bearings and a through coupling. The through coupling 78 is arranged as a tooth/spline/keyed connection which projects through the connecting plate between the primary shaft and bypass transmission. The through coupling rotates at the same speed as the connecting plate but is slidable indeed in axial direction with respect to this connecting plate. FIG. 18 is again a concrete embodiment of the diagrammatic representation of FIG. 17.

Figure 19:
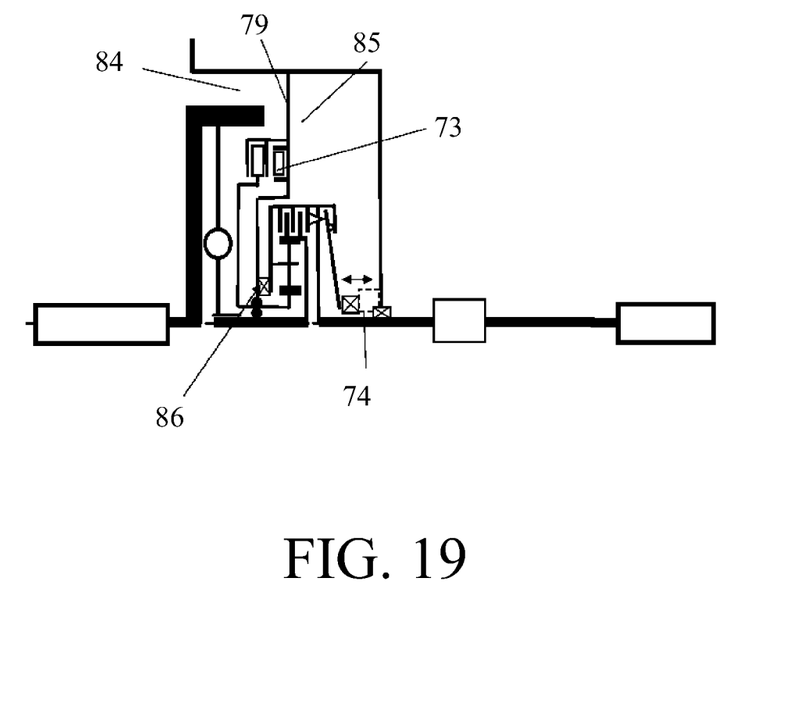
Figure 20:
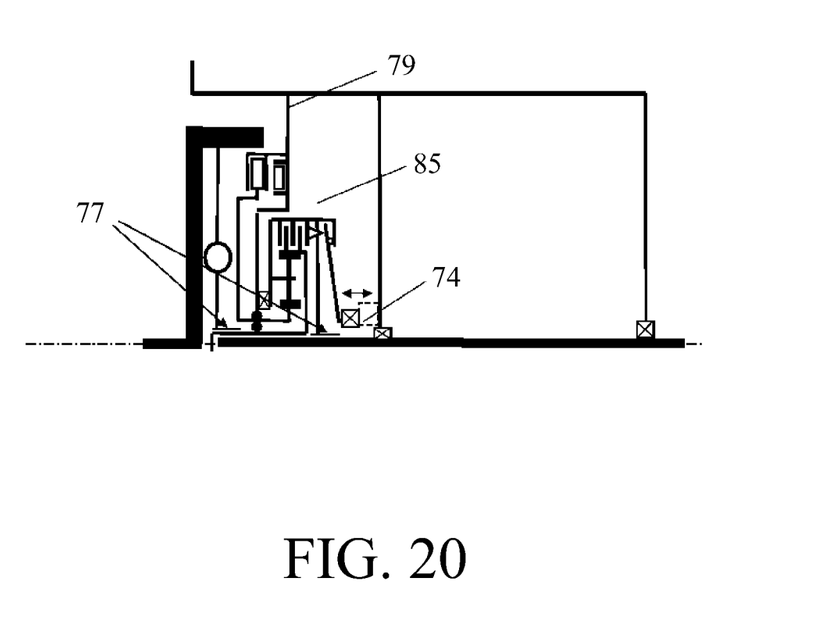

FIGS. 19 and 20 represent embodiments with a wet plate clutch and a dry plate brake. 84 indicates the dry space and 85 the wet space. The actuation force is supported via bearing 86. The embodiment represented in FIG. 19 has the advantage of the launching element (brake) being dry and the power shift element (the clutch) being wet. The supporting forces of the clutch and brake actuators can be directly supported on the intermediate housing part, which is advantageous. In the embodiment represented in FIG. 20 the primary shaft is extended.

Figure 21:
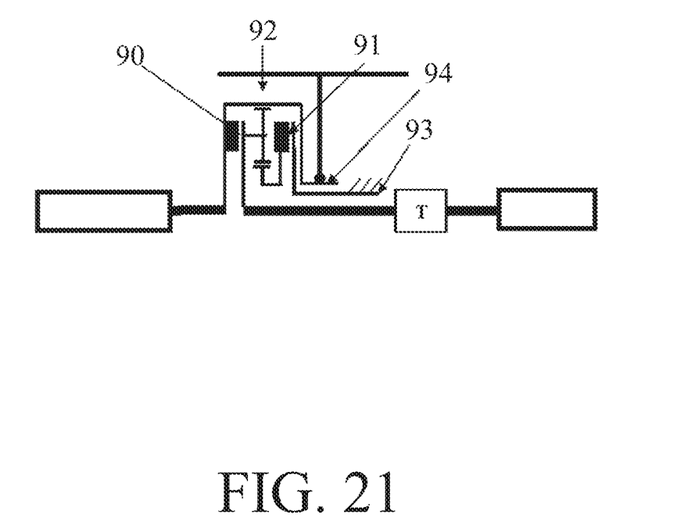
Figure 22:
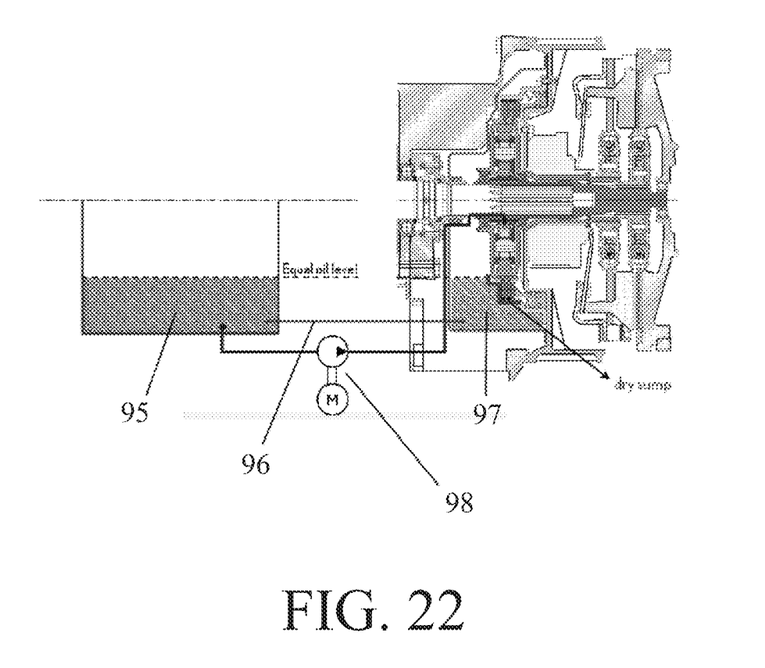
Figure 23:
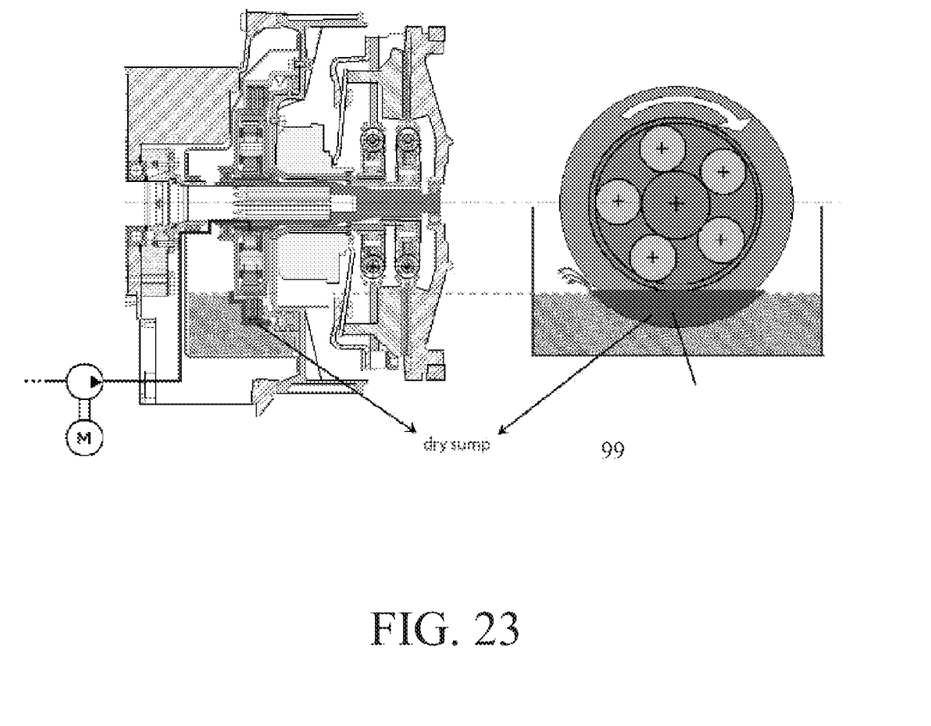

In FIGS. 21, 22 and 23 embodiments are represented having a wet plate clutch and a wet plate brake. The power shift module is constructed here as a substitute for the torque converter. The ratio range of the transmission can then be diminished by means of the switchable prereduction, which provides high efficiency (which the torque converter does not possess). The coupling (lock-up) is referred to as 90 and the brake is referred to as 91. The planetary gear set has 92 as a reference numeral and the housing 93. The connection to the oil pump is referred to as 94. In FIG. 22 the transmission sump is referred to as 95 and 96 indicates a connection to use that very oil. The sump module is referred to as 97 and 98 is an electrical oil pump for lubrication and cooling of the planetary gear set. The oil sump of the transmission is connected to the oil sump of the power shift module. In the power shift module oil sump a partition/receptacle is installed so that the wet brake or clutch need not continuously rotate in the oil, which reduces friction losses. In FIG. 23 a partition is referred to as 99 to keep oil away from the brake so that the brake has less slip loss.

Albeit the invention has been described in the foregoing based on the drawings, it should be observed that the invention is not by any manner or means restricted to the embodiment shown in the drawings. The invention also extends to all embodiments deviating from the embodiment shown in the drawings within the spirit and scope defined by the claims.

The invention claimed is:

1. A vehicle having a transmission and a transmission module comprising:
a clutch that includes two clutch parts which can be mutually coupled, a first clutch part coupled to a drive source of a vehicle and the second clutch coupled to an input shaft of the transmission of the vehicle, which transmission module furthermore comprises a part module which has an input and an output, which part module comprises a bypass transmission with at least three rotational members of which a first rotational member is connected to the input, a second rotational member is connected to the output and the third rotational member can be coupled to a firm object via a brake, the input of the part module being coupled to the first clutch part and/or being capable of coupling to the drive source of the vehicle, and the output of the part module being coupled to the second clutch part and/or being capable of coupling to the input shaft of the transmission of the vehicle, and the bypass transmission being arranged such that the directions of rotation of the input and output shafts of the part module are equal to each other, characterised in that the transmission of the vehicle comprises a continuously variable transmission element; and
wherein the clutch is arranged as a wet plate friction clutch and the brake is arranged as a dry plate friction brake.

2. A vehicle as claimed in claim 1, characterised in that the first rotational member is formed by a ring gear, the second rotational member is formed by a carrier on which planet gears are bearing mounted and the third rotational member is formed by a sun gear.

3. A vehicle as claimed in claim 1, characterised in that the first rotational member is formed by a sun gear, the second rotational member is formed by a second sun gear and the third rotational member is formed by a carrier on which the planet gears are bearing mounted.

4. A vehicle as claimed in claim 1, characterised in that between the first rotational member and a clutch cover forming part of the first clutch part a torsion damper is positioned.

5. A vehicle as claimed in claim 1, characterised in that an intermediate housing part is positioned between the clutch and a transmission housing of the transmission.

6. A vehicle as claimed in claim 5, characterised in that a rotation seal is present between the first rotational member and the intermediate housing part.

7. A vehicle as claimed in claim 1, characterised in that a rotation seal is present between the first rotational member and the primary shaft of the transmission.

8. A vehicle as claimed in claim 1, characterised in that the first and the third rotational members are bearing mounted directly on the primary shaft of the transmission.

9. A vehicle as claimed in claim 1, characterised in that the transmission is accommodated in a separate housing with a sump of its own in which the oil is allowed to stay.

10. A vehicle as claimed in claim 1, characterised in that the gear ratio of the part module, defined by the r.p.m. during operation of the input divided by the r.p.m. of the output, is greater than 1.

11. A vehicle as claimed in claim 10, characterised in that the gear ratio of the part module is greater than or equal to 1.3.

12. A vehicle as claimed in claim 1, characterised in that the part module comprises operating means for operating the clutch.

13. A vehicle as claimed in claim 1, characterised in that the part module comprises further an operating means for operating the brake.

14. A vehicle as claimed in claim 13, characterised in that the operating means and further operating means are fed with compressed air.

15. A vehicle having a transmission and a transmission module comprising:
  a clutch that includes two clutch parts which can be mutually coupled, a first clutch part coupled to a drive source of a vehicle and the second clutch part coupled to an input shaft of the transmission of the vehicle, which transmission module furthermore comprises a part module which has an input and an output, which part module comprises a bypass transmission with at least three rotational members of which a first rotational member is connected to the input, a second rotational member is connected to the output and the third rotational member can be coupled to a firm object via a brake, the input of the part module being coupled to the first clutch part and/or being capable of coupling to the drive source of the vehicle, and the output of the part module being coupled to the second clutch part and/or being capable of coupling to the input shaft of the transmission of the vehicle, and the bypass transmission being arranged such that the directions of rotation of the input and output shafts of the part module are equal to each other, characterised in that the transmission of the vehicle comprises a continuously variable transmission element; and
  wherein the first rotational member is formed by a ring gear, the second rotational member is formed by a carrier on which planet gears are bearing mounted and the third rotational member is formed by a sun gear.

16. A vehicle having a transmission and a transmission module comprising:
  a clutch that includes two clutch parts which can be mutually coupled, a first clutch part coupled to a drive source of a vehicle and the second clutch part coupled to an input shaft of the transmission of the vehicle, which transmission module furthermore comprises a part module which has an input and an output, which part module comprises a bypass transmission with at least three rotational members of which a first rotational member is connected to the input, a second rotational member is connected to the output and the third rotational member can be coupled to a firm object via a brake, the input of the part module being coupled to the first clutch part and/or being capable of coupling to the drive source of the vehicle, and the output of the part module being coupled to the second clutch part and/or being capable of coupling to the input shaft of the transmission of the vehicle, and the bypass transmission being arranged such that the directions of rotation of the input and output shafts of the part module are equal to each other, characterised in that the transmission of the vehicle comprises a continuously variable transmission element; and
  wherein the first rotational member is formed by a sun gear, the second rotational member is formed by a second sun gear and the third rotational member is formed by a carrier on which the planet gears are bearing mounted.

* * * * *